US011109290B2

(12) United States Patent
Logan et al.

(10) Patent No.: US 11,109,290 B2
(45) Date of Patent: Aug. 31, 2021

(54) SWITCHING CONNECTIONS OVER FREQUENCY BANDS OF A WIRELESS NETWORK

(71) Applicant: Charter Communications Operating, LLC, St. Louis, MO (US)

(72) Inventors: William Kenneth Logan, Overland Park, KS (US); Oliver James Jauncey, Bromley (GB)

(73) Assignee: Charter Communications Operating, LLC, St. Louis, MO (US)

(*) Notice: Subject to any disclaimer, the term of this patent is extended or adjusted under 35 U.S.C. 154(b) by 24 days.

(21) Appl. No.: 15/669,182

(22) Filed: Aug. 4, 2017

(65) Prior Publication Data

US 2019/0045407 A1 Feb. 7, 2019

(51) Int. Cl.
*H04W 36/06* (2009.01)
*H04W 48/14* (2009.01)
*H04W 48/18* (2009.01)
*H04W 36/30* (2009.01)
*H04W 36/32* (2009.01)
*H04W 36/36* (2009.01)
*H04W 84/12* (2009.01)

(52) U.S. Cl.
CPC .......... *H04W 36/06* (2013.01); *H04W 36/30* (2013.01); *H04W 36/32* (2013.01); *H04W 36/36* (2013.01); *H04W 48/18* (2013.01); *H04W 84/12* (2013.01)

(58) Field of Classification Search
CPC ..... H04W 36/06; H04W 36/30; H04W 36/32; H04W 36/36; H04W 48/18; H04W 84/12
See application file for complete search history.

(56) References Cited

U.S. PATENT DOCUMENTS

| | | | |
|---|---|---|---|
| 6,636,746 B1 | 10/2003 | Hashem et al. |
| 8,073,441 B1 | 12/2011 | Unger et al. |
| 8,090,386 B2 | 1/2012 | Alizadeh-Shabdiz |
| 9,510,258 B1 | 11/2016 | Chaudhuri et al. |
| 10,306,548 B2 | 5/2019 | Logan |
| 10,652,807 B2 | 5/2020 | Logan |

(Continued)

FOREIGN PATENT DOCUMENTS

EP 2900016 A1 7/2015
EP 2974473 A1 1/2016

(Continued)

OTHER PUBLICATIONS

File History of U.S. Appl. No. 15/669,151, 54 pages, filed Aug. 4, 2017.

(Continued)

*Primary Examiner* — Brian P Cox
(74) *Attorney, Agent, or Firm* — Gazdzinski & Associates, PC (57) ABSTRACT

A technique performed by a client on a device includes detecting one or more wireless networks in range of the device, where the one or more wireless networks support connection over at least two frequency bands; controlling the device to connect to the one or more wireless networks over at least one of the two frequency bands; and controlling the device to switch connections among different ones of the at least two frequency bands based on levels of service provided by the different ones of the at least two frequency bands.

20 Claims, 4 Drawing Sheets

(56) References Cited

U.S. PATENT DOCUMENTS

| | | | |
|---|---|---|---|
| 2006/0166677 A1* | 7/2006 | Derakshan | H04W 36/14 455/453 |
| 2006/0193287 A1 | 8/2006 | Ooshima et al. | |
| 2007/0275717 A1 | 11/2007 | Edge et al. | |
| 2008/0287125 A1 | 11/2008 | Hind et al. | |
| 2008/0291686 A1 | 11/2008 | Cull et al. | |
| 2009/0291686 A1 | 11/2009 | Alpert et al. | |
| 2010/0046466 A1* | 2/2010 | Morimoto | H04W 36/34 370/331 |
| 2010/0149970 A1 | 6/2010 | Miranda et al. | |
| 2010/0159948 A1 | 6/2010 | Spivey et al. | |
| 2011/0029236 A1 | 2/2011 | Zhou et al. | |
| 2011/0165896 A1* | 7/2011 | Stromberg | G06Q 20/32 455/466 |
| 2011/0319084 A1* | 12/2011 | Meshkati | H04W 36/20 455/436 |
| 2012/0166618 A1* | 6/2012 | Dahod | H04L 12/66 709/224 |
| 2012/0238287 A1 | 9/2012 | Scherzer et al. | |
| 2013/0044614 A1* | 2/2013 | Aguirre | H04W 28/24 370/252 |
| 2013/0067535 A1 | 3/2013 | Kang et al. | |
| 2013/0262666 A1* | 10/2013 | Balwani | H04L 12/5692 709/224 |
| 2013/0331098 A1 | 12/2013 | Balasubramaniyan et al. | |
| 2013/0344857 A1 | 12/2013 | Berionne et al. | |
| 2013/0347073 A1* | 12/2013 | Bryksa | H04L 63/105 726/4 |
| 2014/0071895 A1* | 3/2014 | Bane | H04L 69/321 370/328 |
| 2014/0092731 A1 | 4/2014 | Gupta et al. | |
| 2014/0274044 A1 | 9/2014 | Lee et al. | |
| 2014/0315536 A1 | 10/2014 | Chow et al. | |
| 2015/0003417 A1 | 1/2015 | Akiyoshi et al. | |
| 2015/0181405 A1 | 6/2015 | Dua et al. | |
| 2015/0245280 A1 | 8/2015 | Zhou et al. | |
| 2015/0312833 A1* | 10/2015 | Gresset | H04W 48/17 370/329 |
| 2015/0373633 A1 | 12/2015 | Chhabra et al. | |
| 2016/0150451 A1 | 5/2016 | Barreto De Miranda Sargento | |
| 2016/0227544 A1* | 8/2016 | Katar | H04W 48/16 |
| 2016/0234674 A1 | 8/2016 | Maguire | |
| 2016/0316410 A1 | 10/2016 | Tan et al. | |
| 2016/0323900 A1* | 11/2016 | De Domenico | H04B 17/318 |
| 2016/0345228 A1* | 11/2016 | Liu | H04W 36/30 |
| 2016/0381606 A1 | 12/2016 | Lou et al. | |
| 2017/0105216 A1* | 4/2017 | Jung | H04W 40/02 |
| 2017/0181027 A1 | 6/2017 | Raleigh et al. | |
| 2018/0061373 A1 | 3/2018 | Sato et al. | |
| 2018/0184330 A1* | 6/2018 | Egner | H04L 43/065 |

FOREIGN PATENT DOCUMENTS

| | | |
|---|---|---|
| JP | 2012515473 A | 7/2012 |
| JP | 2014068151 A | 4/2014 |
| JP | 2014526849 A | 10/2014 |
| JP | 2016006926 A | 1/2016 |
| JP | 2016517669 A | 6/2016 |
| JP | 2016208371 A | 12/2016 |
| WO | WO-2011016397 A1 | 2/2011 |
| WO | WO-2016095974 A1 | 6/2016 |

OTHER PUBLICATIONS

File History of U.S. Appl. No. 15/669,167, 61 pages, filed Aug. 4, 2017.

File History of U.S. Appl. No. 15/669,192, 48 pages, filed Aug. 4, 2017.

\* cited by examiner

SWITCHING CONNECTIONS OVER FREQUENCY BANDS OF A WIRELESS NETWORK

TECHNICAL FIELD

This specification relates generally switching connections over frequency bands of a wireless network.

BACKGROUND

A wireless network, such as a WiFi network, may permit a mobile device to connect to the wireless network over different frequency bands. In an example, a WiFi network may permit a device to connect over a 2.4 gigahertz (GHz) frequency band, over a 5 GHz frequency band, and/or over a 60 GHz frequency band.

SUMMARY

An example method is performed using a client on a device. The example method includes operations comprising: detecting one or more wireless networks in range of the device, where the one or more wireless networks support connection over at least two frequency bands; controlling the device to connect to the one or more wireless networks over at least one of the two frequency bands; and controlling the device to switch connections among different ones of the at least two frequency bands based on levels of service provided by the different ones of the at least two frequency bands. The example method may include one or more of the following features, either alone or in combination.

The connections may be switched in real-time based also on one or more attributes relating to one or more of: the device, the one or more wireless networks, or the at least two frequency bands. The one or more attributes may comprise at least one of network signal strength, device network preference, device location, or physical barriers within a range of the wireless network.

The device may be controlled to switch connections among ones of the at least two frequency bands to maintain at least a target level of service over the one or more wireless networks. The device may be controlled to switch connections among ones of the at least two frequency bands based on a location of the device relative to a network access point.

At least one of the two frequency bands may include a first frequency band. The device may be controlled to switch connections among ones of the at least two frequency bands by performing operations comprising: severing a connection over the first frequency band; connecting to the wireless network over a second frequency band among the at least two frequency bands; and eventually again connecting to the wireless network over the first frequency band. Controlling the device to connect to the one or more wireless networks may be performed at entry into range of the wireless network. Connecting over the second frequency band may be performed within a threshold distance from an access point of the wireless network. Eventually again connecting over the first frequency band may be performed at exiting from the range of the wireless network.

The example method may comprise configuring the client based on at least one policy that is applicable to a class of devices or that is unique to the device. The least one policy may comprise data for influencing connection between the device and the one or more wireless networks over the at least two frequency bands.

The example method may comprise ranking the one or more wireless networks and the at least two frequency bands. The device may be controlled to switch connections among ones of the at least two frequency bands based on the ranking. The device may be controlled to switch connections among ones of the at least two frequency bands by disconnecting the device over a first frequency band among the at least two frequency bands and connecting the device over a second frequency band among the at least two frequency bands. The connecting and disconnecting may be performed in sequence in real-time.

The levels of service may be based on signal strengths over the at least two frequency bands. The example method may comprise determining signal strength over each of the at least two frequency bands. Controlling the device to switch connections among different ones of the at least two frequency bands may comprise switching connections based on signal strength over the at least two frequency bands.

The levels of service may be based on signal-to-noise ratios over the at least two frequency bands. The method may comprise determining a signal-to-noise ratio over each of the at least two frequency bands. Controlling the device to switch connections among different ones of the at least two frequency bands may comprise switching connections based on signal-to-noise ratios over the at least two frequency bands.

The levels of service may comprise at least a minimum throughput.

Any two or more of the features described in this specification, including in this summary section, may be combined to form implementations not specifically described in this specification.

All or part of the processes, methods, systems, and techniques described herein may be implemented as a computer program product that includes instructions that are stored on one or more non-transitory machine-readable storage media, and that are executable on one or more processing devices. Examples of non-transitory machine-readable storage media include, e.g., read-only memory, an optical disk drive, memory disk drive, random access memory, and the like. All or part of the processes, methods, systems, and techniques described herein may be implemented as an apparatus, method, or system that includes one or more processing devices and memory storing instructions that are executable by the one or more processing devices to perform the stated operations.

The details of one or more implementations are set forth in the accompanying drawings and the description below. Other features and advantages will be apparent from the description and drawings, and from the claims.

DETAILED DESCRIPTION

Described herein are example processes, which may be performed by a client on a mobile device ("device"), that enable switching connections over different frequency bands of one or more wireless networks. The example processes are rooted in computer technology in order to overcome a problem specifically arising in the realm of computer networks. Specifically, movement of a device can result in changes to network performance. For example, as a device moves, the device goes into, and out of, ranges of different wireless networks. As a network's signal wanes due to this movement, the performance of the device over the network may suffer. Factors other than movement may also impact device performance on a network. For example, the number of users on a network can reduce the available bandwidth for the device, which can reduce throughput and increase latency. Obstacles in the path of network signals may affect their strength, and so forth.

Figure 1:
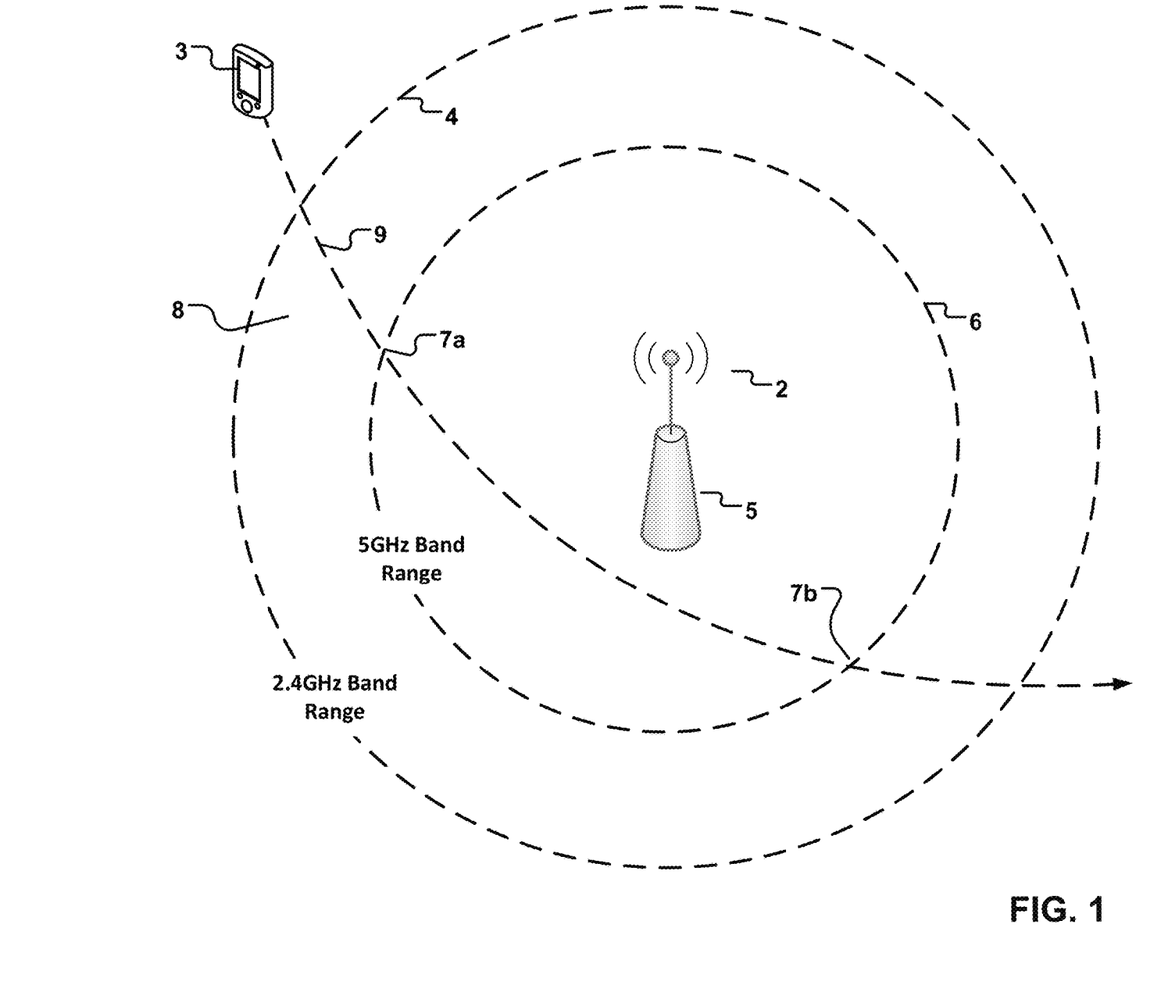
FIG. 1 is a block diagram showing an example where frequency band connections are switched during movement through a single wireless network.

Referring to FIG. 1, as explained, a wireless network, such as a WiFi network, may permit a mobile device to connect to the wireless network over different frequency bands. In an example, a WiFi network 2 may permit a mobile device 3 to connect over a 2.4 gigahertz (GHz) frequency band ("band") or over a 5 GHz band. A 60 GHz band may also be available in some networks, but is not considered for the purposes of this example. In some environments, the 2.4 GHz band WiFi signal reaches a range 4 of about 150 to 200 meters from the signal's origin point 5, which may be a network access point. In some environments, the 5 GHz band WiFi signal reaches a range 6 of about 50 to 80 meters from the network access point 5. As shown, an example mobile device 3 moves in the direction of arrow 9 into an area 8 covered by wireless network 2. If mobile device 3 is configured to connect over the 2.4 GHz band only, mobile device 3 may connect throughout the entire range 4 of the wireless network; however, the mobile device will not be able to take advantage of the higher throughput available on the 5 GHz band. Conversely, if mobile device is configured to connect over the 5 GHz band only, the mobile device will be able to take advantage of the 5 GHz higher throughput, but will be unable to take advantage of the full range 4 of the wireless network, e.g., the device will be limited to range 6 provided by the 5 GHz signal instead of range 4 provided by the 2.4 GHz signal.

To address these problems, the mobile device may be controlled to switch connection over different frequency bands supported by the wireless network. For example, the device may be configured to scan for the wireless network, and the different frequency bands supported by the wireless network. As shown in FIG. 1, mobile device 3 moves into the area 8 covered by wireless network 2, and first encounters the 2.4 GHz frequency band, since the 2.4 GHz band has a greater range 4 than the 5 GHz band. Accordingly, device 3 is configured to connect first to wireless network 2 over the 2.4 GHz band. As the device travels through area 8, e.g., along the path represented by arrow 9, at point 7a the device will eventually encounter the 5 GHz band. After encountering the 5 GHz band, the device is controlled to switch the frequency band over which it connects to the network. In this example, the device is controlled to switch its connection to network 2 over the 5 GHz band. As a result, while in-range 6 of the 5 GHz band, the device is able to take advantage of the higher level of service provided by the 5 GHz band. For example, the 5 GHz band may provide greater throughput than the 2.4 GHz band, resulting in better device performance in the 5 GHz range 6. As device 3 continues to travel, at point 7b, device 3 eventually exits the 5 GHz range 6, and re-enters the 2.4 GHz range 4. Accordingly, the device is configured to switch its connection from the 5 GHz band back to the 2.4 GHz band. As a result, the device is able to maintain its connection longer due to the extended 2.4 GHz range 4, albeit at a potentially lower level of service (e.g., lower throughput) provided by the 2.4 GHz band.

By switching connections among different frequency bands, mobile device 3 is able to take advantage of different features of the different frequency bands and thereby improve (e.g., optimize) its network performance. In this example, performance is optimized for both distance and throughput. That is, in this example, for instance, switching frequency bands allows the device to maintain a wireless network connection over a maximum range 4, while still taking advantage of the greater throughput provided by the more limited-range 5 GHz band. In other examples, considerations other than range and performance may be used to dictate whether, when, and under what circumstances frequency bands are switched.

In some examples, the wireless networks include WiFi networks; however, the processes described herein ("the processes") for switching connections among frequency bands may be used with any appropriate type of wireless network, examples of which are provided below. In some implementations, the example processes are performed, at least in part, on a client on the mobile device after the client has been decided to connect to a wireless network and while the device is connected to the wireless network. The example processes may include detecting one or more wireless networks in range of the device that support device connection over at least two frequency bands. The detection operation may be performed as part of a process used to determine whether to connect to the wireless network or it may be a separate operation performed as part of a process for switching connections among frequency bands. In some implementations, the availability of certain frequency bands for connection may be a factor in determining whether the mobile device decides to attempt connection to the wireless network.

The operations for switching connections among frequency bands may also include controlling the device to connect to the one or more wireless networks over at least one of the two frequency bands. The device may be controlled to first connect over a frequency band having a greatest range, such as the 2.4 GHz band in the prior example. Thereafter, the device may be controlled to switch connections among different ones of the at least two frequency bands based on levels of service provided by the those frequency bands. In the above example, within the range of the 2.4 GHz band, the device encounters a 5 GHz band. The 5 GHz band provides more data throughput than the 2.4 GHz band. Therefore, the device switches its connection from the 2.4 GHz band to the 5 GHz and, and maintains that connection while the device is in-range of the 5 GHz band. When the device exits the 5 GHz band, it reconnects to the 2.4 GHz band, resulting in a longer-duration connection than would be possible if the device were configured only for the 5 GHz band.

The example processes may be performed, in whole or in part, by the client, which is stored in memory on the mobile device. The client may include executable instructions to implement the processes described herein for selecting, and switching among, frequency bands. In some implementations, the client runs continuously in the background during device operation. The example processes may be implemented, at least in part, also using one or more servers ("servers"). The servers may include one or more software modules comprised of executable instructions to configure the mobile device to implement the processes. For example, in some implementations, the servers may store policies that contain rules or other information for controlling circumstances under which the device switches among different frequency bands of a wireless network.

The policies may be loaded onto the servers by an owner of the mobile device or by any other appropriate party having an interest in the operation of the mobile device. For example, an internet service provider (ISP), a mobile network provider, or other party may load the policies on the servers. A Web interface, application programming interface (API), or other appropriate interface may be used to load the policies onto the server. The mobile device may synchronize ("synch") with the server intermittently, periodically, or at any appropriate time to receive, from the server, an operational policy ("policy") that is designated for the mobile device. Synching may be user-initiated or it may be performed automatically based on time or some operational trigger. Either the mobile device or the server may initiate communication. The mobile device and the server may communicate with each other over the Internet or over any other appropriate network or networks. In some implementations, the server may push a policy to the mobile device, or the mobile device may pull a policy from the server. In some examples, the policies on the server may be indexed by telephone number, user name, address, device identifier, or other appropriate indicia. The server may recognize the mobile device based on information such as this, and access appropriate policies for the mobile device.

An example policy for a mobile device may specify, among other things, to control the mobile device to connect over, to switch to, or to steer between, frequency bands based solely on the connection frequency. For example, a policy may specify to connect over, to switch, or steer, to a higher or highest frequency band that is encountered and is in-range. An example policy for a mobile device may specify, among other things, to control the mobile device to connect over a frequency band based on the frequency and also based on network attributes, device attributes, or both network and device attributes. For example, a policy may specify to control the device to connect over, to switch to, or to steer to, a higher or highest frequency band based also on attributes that affect the levels of service provided on the different frequency bands. For example, a policy may specify to control the device to connect over, to switch to, or to steer to, a higher or highest frequency band so long as the higher or highest frequency band results in better network service in at least one respect based on the attributes considered.

Examples of attributes that may be considered or taken into account include, but are not limited to, ranges of coverage of the frequency bands, throughput attainable on the frequency bands, the number of channels in each frequency band, the device's ability or inability to connect over the certain frequency bands, quality of service (QoS) achievable over the different frequency bands, network latency over the different frequency bands, network security on different frequency bands, a preference of the device for particular frequency band(s), the number of users on a particular frequency band, the signal strength of the frequency bands, signal-to-noise ratio (SNR) associated with the frequency bands, and so forth. This list is not exhaustive, and any appropriate attributes may be taken into account in determining whether to connect over a particular frequency band. Other attributes not specified herein may be used instead of, or in addition to, those specified. In addition, attributes other than device and network attributes may be factored into decisions about whether to connect to a wireless network over a frequency band. For example, if the device moves into an area having large amounts of radio frequency (RF) background signals, other radiation, or physical obstacles, these may affect network connection over some frequency bands more than over others. Accordingly, the client may be configured to evaluate whether a frequency band is appropriate for connection in a particular area, and determine whether connection over that frequency band is appropriate given the characteristics of the area. Information about an area may be obtained from a policy or from any other appropriate source, such as the Internet.

In some implementations, a policy may control the client to switch among different frequency bands in order to maintain some minimum level of service, such as throughput. In some implementations, a policy may control the client to switch among different frequency bands in order to take advantage of different network attributes. In the example provided previously, a policy may include taking advantage of the greater range of the 2.4 GHz band and of the higher throughput of the 5 GHz band. In this regard, a 60 GHz WiFi signal has a shorter range than the 5 GHz band, but a greater throughput than the 5 GHz range. Accordingly, a policy may be configured to steer a mobile device first to the 2.4 GHz band, then to the 5 GHz band when it comes in-range, then to the 60 GHz band when it comes in-range, then back to the 5 GHz band as the device exits the 60 GHz band range, and then back to the 2.4 GHz band as the device exits the 5 GHz band range.

In some implementations, one or more policies may instruct the client to cause the device to switch between different frequency bands of different wireless networks. For example, the device may be controlled to first connect over a frequency band of a first wireless network, such as the 2.4 GHz band in the prior example. Thereafter, the device may be controlled to switch connections to connect over a 5 GHz band of a second, different wireless network when that band is encountered. As the device goes out of range of the second wireless network, the device may be controlled to reconnect over the 2.4 GHz band in the first wireless network. Switching such as this may be implemented in cases in cases where the device is connected to multiple wireless networks concurrently, or in cases where the device does not maintain concurrent connections to multiple wireless networks.

The policies described above are examples. In general a policy may set any appropriate criteria for selecting and switching among different frequency bands of a single wireless network or of different wireless networks.

Figure 2:
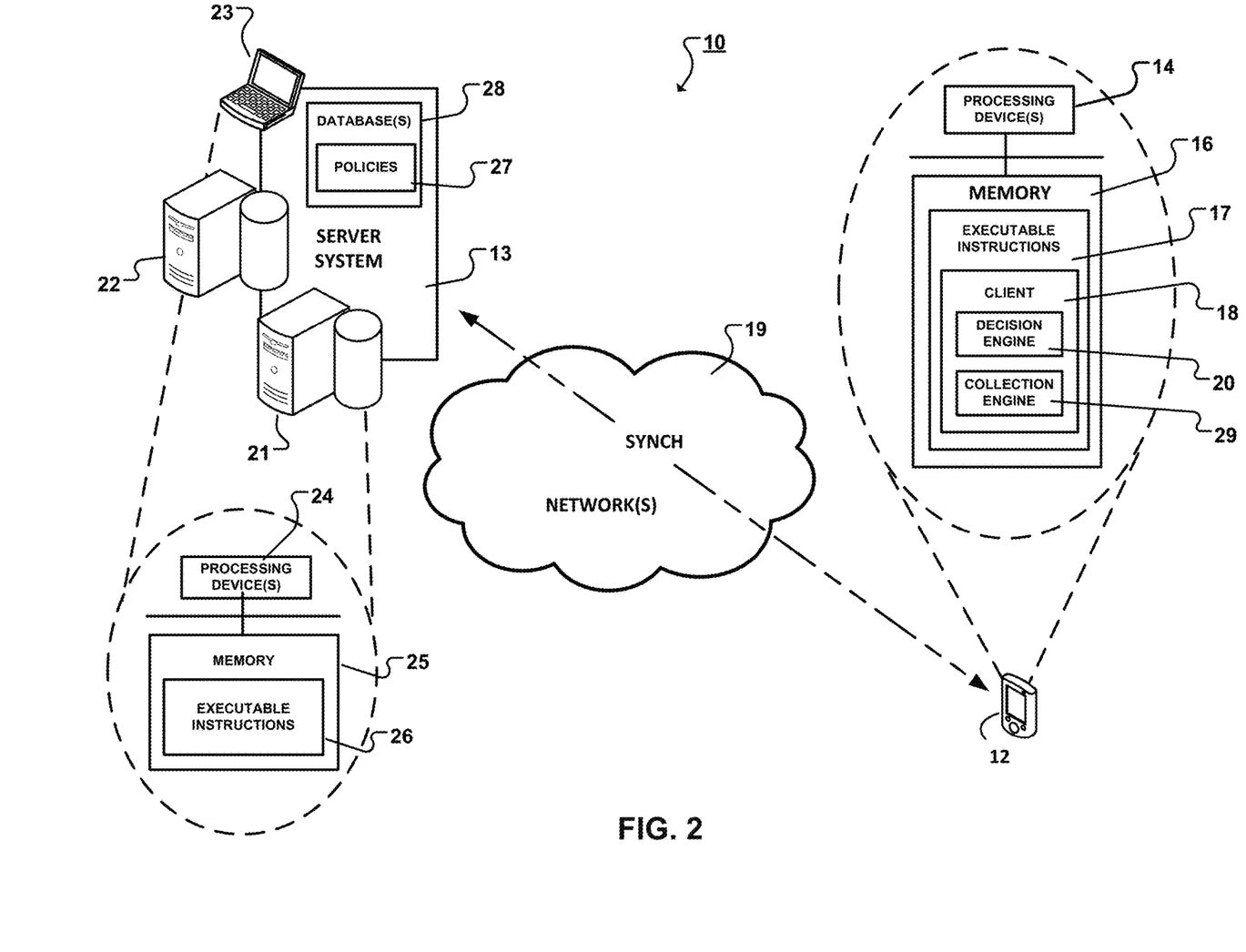
FIG. 2 is a block diagram of an example computer/network architecture on which the example processes described herein may be implemented.

FIG. 2 shows an example computer/network architecture 10 on which the example processes for selecting and switching among different frequency bands may be implemented. The processes, however, are not limited to use with the architecture of FIG. 2, and may be implemented on any appropriate computer architecture and/or network architecture.

In FIG. 2, example computer/network architecture 10 includes a mobile device 12 and a server system 13. Mobile device 12 may be the same as mobile device 3 of FIG. 1 or different. In this regard, the mobile device may be, or include, any appropriate device capable of communicating over a computer network including, but not limited to, a smartphone, a cellular telephone, a digital camera, a tablet computing device, a laptop computer, and so forth. Mobile device 12 may include one or more processing devices 14 (e.g., microprocessors) and memory 16 storing computer/machine-executable instructions 17 that are executable by the one or more processing devices. The instructions may be part of one or more computer programs that implement a client 18 that controls all or part of frequency band selecting and switching functionality described herein. In some implementations, the client may include a decision engine 20 that determines whether to connect to a wireless network, and that implements the processes described herein. In some implementations, the client may also include a collection engine 29, which obtains, e.g., network attributes, device attributes, or both network and device attributes, and provides those attributes to the decision engine for use in determining which frequency band to use for connection to a wireless network. In some implementations, the decision engine and the collection engine include functionality other than that described herein. In some implementations, mobile device 12 may be connected to, and accessible over, any appropriate network 19, such as a WiFi network, an LTE (long-term evolution) network, and so forth.

In some implementations, the decision engine employs voting modules to evaluate a candidate network for connection to a mobile device based on network attributes, device attributes, or both network and device attributes. In some implementations, each voting module casts a vote indicating whether or not to connect the mobile device to the candidate network. The votes may be used to determine whether to connect to the candidate network. Votes may be based on whether a network attribute, such as those described herein, meet a predefined baseline. In some implementations, the votes may be evaluated numerically, qualitatively, or in other appropriate ways. In some implementations, the processes described herein for selecting, and switching among, frequency bands may be implemented by the decision engine after it is determined to connect to a wireless network and repeated, when appropriate, for a duration of the connection. In some implementations, a frequency band may be one of the attributes evaluated to determine if connection is to a wireless network is approved.

Server system 13 may include one or more computing devices 21, 22, 23 examples of which may include one or more servers, desktop computers, mobile devices, and so forth. An example server system may include one or more processing devices 24 (e.g., microprocessors) and memory 25 storing instructions 26 that are executable by the one or more processing devices. The instructions are part of one or more computer programs that may be used to implement at least part of the processes described herein. For example, the instructions may enable communication between the mobile device and the server system in order to provide the client on the mobile device with policies 27 that control the device's operation, including to implement the frequency band selection and switching processes described herein. These policies may be stored in a database 28 on the server system or at any other appropriate location that is accessible to the server system. Server system 12 may also be connected to, and accessible over, a wired or wireless network 19. In some implementations, the processes may not use the server system, but rather may be implemented solely on the mobile device. For example, policies may be pre-installed on the mobile device, or a user of the mobile device may program the mobile device with one or more appropriate policies.

Mobile device 12 and server system 13 may communicate with each other, and with other systems, such as those described herein, over one or more computer networks 19, which may include wireless and/or wired networks.

Figure 3:
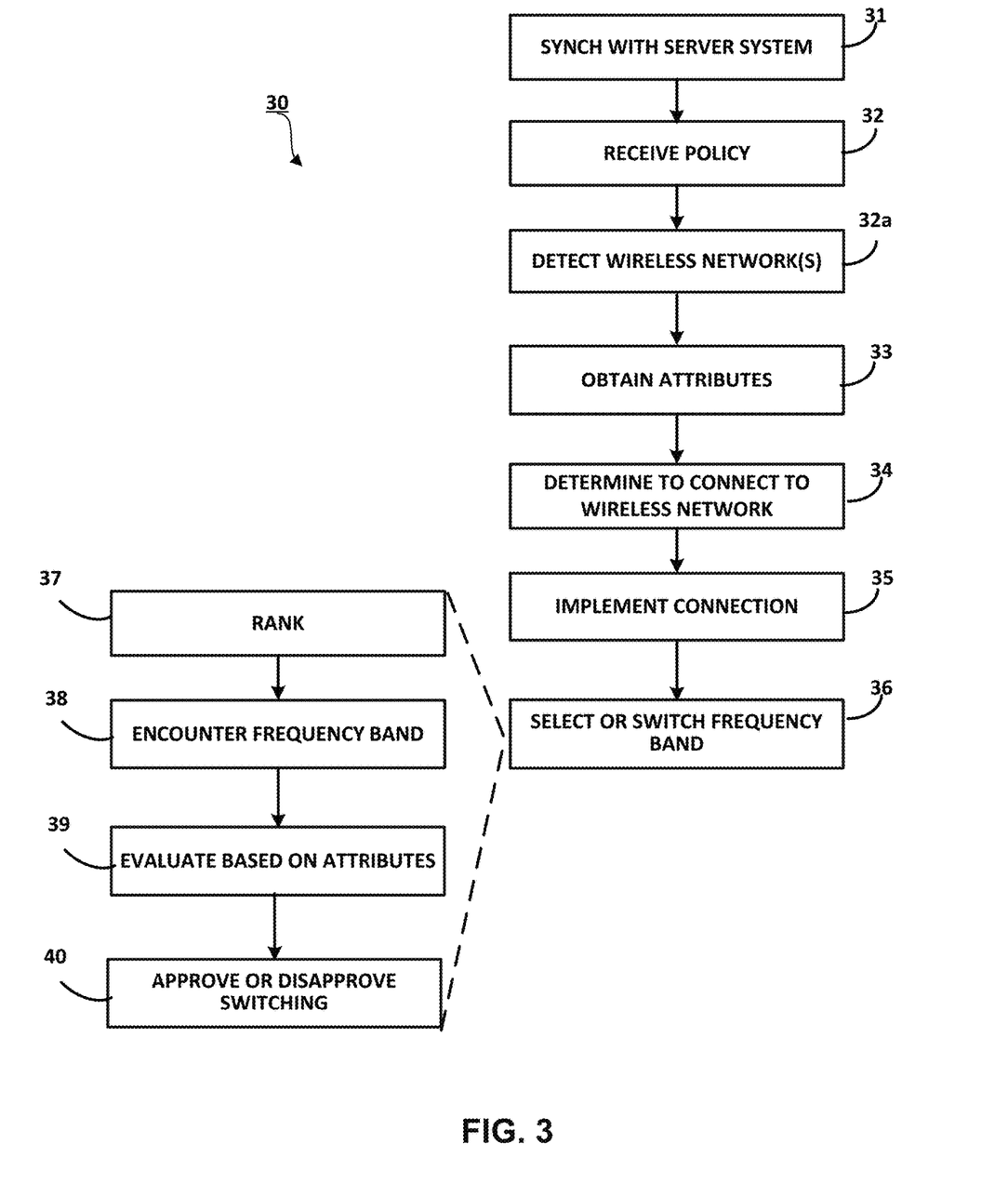
FIG. 3 is a flowchart showing an example process for switching connections over frequency bands of one or more wireless networks.

FIG. 3 shows an example process 30 for selecting, and switching among, frequency bands of one or more wireless networks. Process 30 may be performed by client 18 in whole, or in part, on the architecture of FIG. 3. According to process 30, client 18 in mobile device 12 synchs (31) with server system 13 over one or more computer networks 19. As explained, during this synchronization, a policy may be pushed by the server system to the client, or the client may request and receive the policy from the server system. In any case, the client receives (32) the policy from the server system. The policy specifies, among other things, the conditions under which a device may select, or switch, frequency bands of a wireless network or may select, or switch, frequency bands of two or more wireless networks. As explained above, selecting or switching may take into account the frequencies of the band alone or in combination with one or other attributes.

As noted, examples of attributes that may be considered during selecting and switching include, but are not limited to: ranges of coverage of the frequency bands, throughput attainable on the frequency bands, the number of channels of each frequency band, the device's ability or inability to connect over the certain frequency bands, quality of service (QoS) achievable over the different frequency bands, network latency over the different frequency bands, network security on different frequency bands, a preference of the device for particular frequency band(s), the number of users on a particular frequency band, the signal strength of the frequency bands, signal-to-noise ratio (SNR) associated with the frequency bands, levels of radio frequency (RF) background signals, other radiation in the area, physical barriers or obstacles in the area, and so forth. As appropriate, multiple policies may be programmed into the client and used as described herein.

In some implementations, the client may configure the decision engine based on one or more received policies so that the decision engine determines whether, when, and under what circumstances to select or switch among frequency bands in a connection to a wireless network or networks. The policy also may include how often to scan for wireless networks in order to identify a wireless network. In this regard, a mobility state of the device corresponds to an amount of motion experienced by the mobile device. For example, the mobility state may be characterized by a speed or velocity of the device. In some implementations, the mobility state may be a factor in determining whether a connection may be made to a wireless network. For example, In some implementations, the mobility state of a device affects how aggressively the device switches between wireless networks. To this point, the mobility state of a device may affect how often scanning for new networks is performed by the client, which may affect how often the voting modules evaluate attributes. For example, more aggressive switching may require more frequent scanning, whereas less aggressive switching may require less frequent scanning. Based on this information, the client 18 scans for, and detects (32a) a wireless network that is in-range of the mobile device. In some implementations, more than one wireless network that is in-range may be detected.

In some implementations, a policy may direct the client to configure the decision engine so that the decision engine determines whether to switch between frequency bands based on signal strength over those frequency bands. For example, as explained herein, at farther locations from a network access point, network signal strength in different frequency bands may vary. For example, signals in a 2.4 GHz band will travel farther and, therefore, be stronger, at points farther from the network access point than signals in the 5 GHz frequency band or the 60 GHz frequency band. Likewise, signals in the 5 GHz band will travel farther and, therefore, be stronger, at points farther from the network access point than signals in the 60 GHz frequency band. At some locations, signals in two or more frequency bands will be discernable. For example, at some points, it may be possible to connect over the 2.4 GHz band or the 5 GHz band, or over the 2.4 GHz band, the 5 GHz band, or the 60 Ghz band. In some implementations, the policy may direct the decision engine to determine the signal strength over the different frequency bands, and to select a frequency band for connection that meets one or more predefined criteria. For example, the signal strength of each band may be compared to a baseline. The policy may direct the decision engine to select the greatest frequency band whose signal strength exceeds the baseline. For example, if the signal strength over the 2.4 Ghz band and the 5 GHz band both exceed the baseline, the decision engine may be configured to select the 5 GHz band for connection, since the 5 GHz band provides benefits, such as greater throughput, that the 2.4 GHz band does not provide. In another example, decision engine may be configured to connect over whichever frequency band provides the strongest signal. In an example, the signal strength over the 2.4 GHz band, the 5 GHz band, and the 60 GHz band may be compared to each other. Whichever frequency band provides the greatest signal strength will be selected for connection to the wireless network. These operations may be performed for more than three frequency bands, and for frequency bands other than 2.4 GHz, 5 GHz, and 60 GHz.

In some implementations, a policy may direct the client to configure the decision engine so that the decision engine determines whether to switch between frequency bands based on the signal-to-noise (SNR) ratio over those frequency bands. For example, as explained herein, background radiation, other wireless signals, obstacles, or other factors may affect signal quality in a particular area. Furthermore, at some locations, signals in two or more frequency bands will be discernable. For example, at some points, it may be possible to connect over the 2.4 GHz band or the 5 GHz band, or over the 2.4 GHz band, the 5 GHz band, or the 60 Ghz band. In some implementations, the policy may direct the decision engine to determine the SNR over each discernable frequency band, and to select a frequency band for connection that meets one or more predefined criteria. For example, the SNR of each band may be compared to a baseline. The policy may direct the decision engine to select the greatest frequency band whose SNR is below the baseline, e.g., the signal that has less, or the least, noise relative to the signal. For example, if the SNR over the 2.4 Ghz band and the 5 GHz are both below the baseline, the decision engine may be configured to select the 5 GHz band for connection, since the 5 GHz band provides benefits, such as greater throughput, that the 2.4 GHz band does not provide. In another example, decision engine may be configured to connect over whichever frequency band provides the lowest SNR. In an example, the SNR over the 2.4 GHz band, the 5 GHz band, and the 60 GHz band may be compared to each other. Whichever frequency band provides the lowest SNR will be selected for connection to the wireless network. These operations may be performed for more than three frequency bands, and for frequency bands other than 2.4 GHz, 5 GHz, and 60 GHz.

Client 12 obtains (33) attributes relating to the device, to the detected wireless network or networks, or to both the device and the detected network(s). Although FIG. 3 shows the attributes being obtained before connection, that is not a requirement. Rather, the attributes may be obtained at any appropriate time, including before, during, and after connection to the wireless network. In some implementations, as noted, a collection engine 29 obtains the attributes. For example, the attributes relating to the device may be obtained from the device itself or from a device profile obtained from the server system at the time a policy is obtained. In some implementations, the attributes relating to the detected network(s) may be obtained from the networks through measurement (e.g., by sending and receiving test packets) over the network in a case where there is a current connection to the network that enables these operations. In some implementations, the attributes relating to the device, to the wireless networks, or to both the device and the wireless networks may be obtained by monitoring the device over time. Examples of the attributes are listed previously. As noted, the listing of attributes provided herein is not exhaustive. Any appropriate attributes may be used to decide over which frequency band to connect to a network.

In some implementations, the attributes relate to one or more wireless networks that is/are also in-range of the mobile device other than a detected network. Attributes relating to these other wireless networks may be used, where appropriate, to evaluate whether frequency bands of those other networks are better candidates for the mobile device than a frequency band of the detected network. Attributes relating to these other wireless networks also may be taken into account to the extent that those other wireless networks affect connection between the mobile device and the detected wireless network, or transfer of data between the mobile device and the detected wireless network. In this regard, FIG. 4 (described below) shows an example in which a mobile device is controlled to switch between frequency bands on different WiFi networks to improve performance.

Client 18 determines (34) to connect to the wireless network, and thereafter controls (35) the device to implement the network connection. As explained above, the decision to connect may be determined by voting modules that evaluate a candidate network for connection to a mobile device based on network attributes, device attributes, or both network and device attributes, such as attributes similar to those described herein. In an example, each voting module casts a vote indicating whether or not to connect the mobile device to the detected wireless network. The votes are evaluated to determine whether to connect to the candidate network. In this regard, following a decision to connect to a wireless network, the client attempts to make the connection. However, not all attempts may be successful for a variety of reasons. In some implementations, the device connects to the wireless network over the first frequency band that the device encounters. If multiple frequency bands are encountered, the client may evaluate which of those frequency bands provides the best level of service using the processes described herein, and may control the device to connect over that frequency band first, and potentially switch among frequency bands as levels of service among the frequency bands change.

During or after connection, process 30 includes controlling the device to select, or switch, (36) frequency bands. As explained herein, wireless connection may be implemented over an initial frequency band, and the frequency band used for connection may be changed as new frequency bands are encountered. As also explained, the change in frequency bands may be based on a policy programmed into a client which may, e.g., control changes to frequency bands based solely on frequency or based on frequency in combination with one or more attributes, such as those described herein, to improve device performance. In some implementations, the connections may be switched in real-time, and the switching processes may be implemented so as to reduce (e.g., minimize) their effects on a user. For example, if the user is downloading a large file, the processes may wait until that file download is complete before implementing the switching.

In some implementations, selecting and switching frequency bands may include ranking (37) frequency bands and wireless networks containing those frequency bands, and controlling the switching based on the rankings. For example, the client may determine, or predict, beforehand the different levels of service resulting from connection to the wireless network over different frequency bands, and prioritize connection over those frequency bands based on their determined levels of service. In controlling the device to select, or to switch, frequency bands, the client may start with the highest-ranked frequency band on the list and move down the list until a frequency band of a wireless network in-range is encountered, and attempt connection to the wireless network over that frequency band. If a connection cannot be made for any reason, the client may move to the next, lower-ranked frequency band on the list in attempt connection. This process may continue until a connection is made or until there are no additional frequency bands or networks to consider. In examples where there is only one wireless network and frequency band in-range, the mobile device may connect to that wireless network and frequency range, and reevaluate the list upon encountering additional frequency bands, wireless networks, or both frequency bands and wireless networks.

In some implementations, selecting and switching frequency bands may include encountering (38) a new frequency band and identifying where the new frequency band is in the ranking. If the new frequency band is above the band currently in use for connection, the process includes evaluating (39) the new frequency band based on one or more of attributes, such as those described herein, and approving or disapproving (40) switching of the device to the new frequency band based on the evaluation. For example, if the new frequency band is a higher-frequency band and/or provides a better level of service, switching may be approved. If the switching is approved, an attempt is made to connect over the new frequency band. If switching is disapproved, no action is taken. Similar operations may be performed for selecting an initial band for connection.

Figure 4:
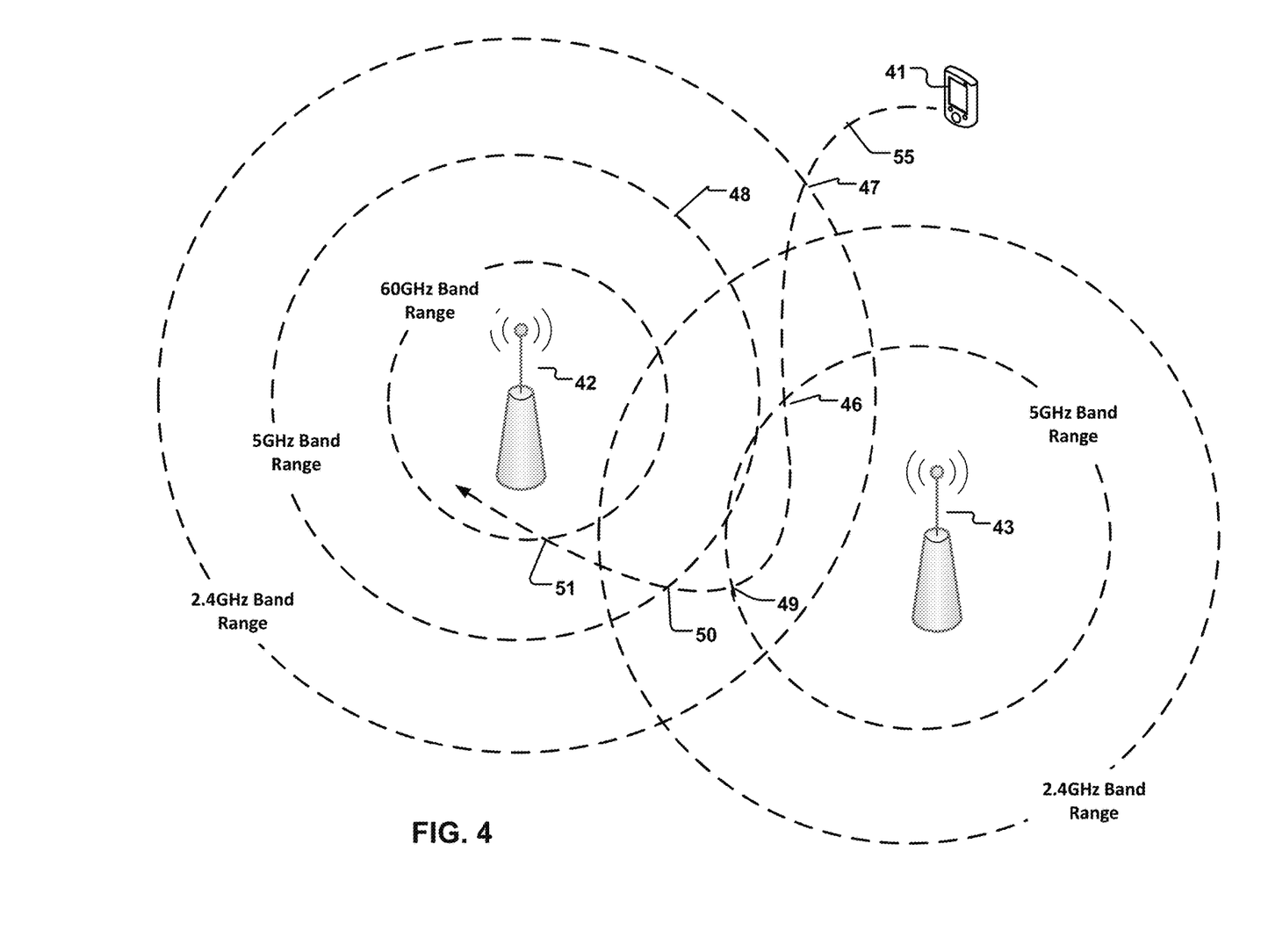
FIG. 4 is a block diagram showing an example where frequency band connections are switched during movement through two different wireless networks.

In some implementations, controlling the device to select, or to switch, (36) connections over one frequency band to another frequency band may include severing an existing connection over one frequency band (e.g., 2.4 GHz); connecting to the wireless network over a new frequency band (e.g., 5 GHz); and eventually again connecting to the wireless network over the original frequency band (e.g., 2.4 GHz). This example is described above with respect to FIG. 1, and may be generalized to include any appropriate sequential connections to increasing-frequency bands followed by any appropriate sequential connections to decreasing-frequency bands, e.g., connect over a 2.4 GHz band; sever the connection over the 2.4 GHz band and connect over a 5 GHz band; sever the connection over the 5 GHz band and connect over a 60 GHz band; sever the connection over the 60 GHz band and connect over a 5 GHz band; and sever the connection over the 5 GHz band and connect over the 2.4 GHz band. This example may be generalized to include non-sequential connections. For example, in some cases, non-sequential connection may be more advantageous from a service standpoint than sequential connections. For example, a connection sequence may include: connect over a 2.4 GHz band; sever the connection over the 2.4 GHz band and connect over a 5 GHz band; sever the connection over the 5 GHz band and connect again over the 2.4 GHz band; sever the connection over the 2.4 GHz band and connect over a 60 GHz band; and sever the connection over the 60 GHz band and connect over the 5 GHz band. Physical barriers of obstacles such as walls, electromagnetic shielding, or environmental radiation may impact which bands provide the best level of service and, therefore, which connections to make and in which sequence. FIG. 4 below shows an example of non-sequential connections involving two wireless networks.

Referring back to the example of FIG. 1, as a device 3 moves relative to and within the range of the wireless network, e.g., from point 7a to point 7b in area 8, the device encounters two different frequency bands of the wireless network. At each point 7a and 7b, client 18 may control device 3 to switch (36) connections among different ones of the two frequency bands based on levels of service provided by the different frequency bands. In some implementations, client 18 may control the device to maintain an existing network connection on a frequency band based on constraints defined in one or more policies. For example, if switching from one frequency band (e.g., 2.4 GHz) to another frequency band (e.g., 5 GHz) will negatively impact one or more attributes, such as throughput, latency, or others listed herein, the client may control the device so as not to implement the switch. For example, if the throughput for the 5 GHz frequency band does not meet a predefined baseline, or will not result in a percentage improvement over the 2.4 GHz band improvement, switching may not be performed. An example of a baseline is a threshold, a combination of thresholds, a range, or any other appropriate information against which to evaluate (e.g., to compare) one or more values, such as attribute values The policy or policies programmed into the client may dictate the circumstances under which frequency bands are to be switched or not to be switched when new frequency bands are encountered.

As noted, in some implementations, the processes described herein may be used to connect over different frequency bands of two or more different wireless networks. In the example of FIG. 4, a mobile device 41 may move in the direction of arrow 55. During movement, the mobile device 41 may first connect over a 2.4 GHz band of WiFi network 42 at point 47. But, during movement, the mobile device may first encounter a 5 GHz band of WiFi network 43 at point 46 before encountering the 5 GHz band of WiFi network 42 at range 48. In this example, assuming there is not a significant different in performance over the two networks 42 and 43 and connection to a new WiFi network is approved through the voting mechanism, the device may be controlled to disconnect from the 2.4 GHz band of WiFi network 42, and then to connect over the 5 GHz band of WiFi network 43. As the device 41 moves, it may then connect over the 2.4 GHz band of WiFi network 42 at point 49 and then the 5 GHz band of WiFi network 42 at point 50, and then to the 60 GHz band of WiFi network 42 at point 51, and so forth, in order to achieve the best performance based on the availability of WiFi networks and frequency bands over which to connect to the WiFi networks. As each connection is made, the prior connection may be severed. In some cases, if performance will suffer due to a switch, then the switch may not be made. This example may be generalized such that switching frequency bands may be implemented among more than two wireless networks and may involve any appropriate number of wireless networks, frequency bands, and channels. When switching between wireless networks in order to connect over a desired frequency band, the voting mechanism described herein may, or may not, be employed to approve or deny the switch between wireless networks.

In some implementations, the location of the mobile device relative to the network access point may affect connection over a particular frequency band. For example, as noted, a 2.4 GHz signal propagates farther in space than a 5 GHz signal, which propagates farther in space than a 60 GHz signal. If a mobile device is relatively far away from a network access point from which these signals emanate then, based on attributes or other factors, the device will most likely connect over the 2.4 GHz band. If the device is relatively closer to the network access point from which these signals emanate and within range of the 5 GHz band, based on attributes or other factors, the device will most likely connect over the 5 GHz band. If the device is relatively still closer to the network access point from which these signals emanate and within range of the 60 GHz band, based on attributes or other factors, the device will most likely connect over the 60 GHz band. Barriers or obstacles may have the greatest effect on propagation of higher-frequency signals. For example, a physical barrier that prevents propagation of a 60 GHz signal may allow a 5 GHz signal and a 2.4 GHz signal to pass, and a physical barrier that prevents propagation of a 60 GHz signal and a 5 GHz signal may allow a 2.4 GHz signal to pass. Accordingly, location of the mobile device relative to the network access point and intervening physical barriers or obstacles also impact to which frequency band of a wireless network a mobile device may connect.

The processes have been described in the context of WiFi networks; however, the processes may be used with any appropriate wireless network or networks. Examples of such other networks include, but are not limited to, cellular networks, such LTE networks, 3G networks, and 4G networks, Internet-of-Things (IoT) networks, local area networks (LANs), wide area networks (WANs), or any appropriate combination of wireless networks. In this regard, the processes may be applied to switch frequency bands between the same type, or between different types, of wireless networks.

The processes may be used with both managed and unmanaged wireless networks. In some examples, to operate on a managed network, the client obtains device security credentials along with a policy. Examples include, but are not limited to, a username and password. This information is provided to the wireless network during connection operations. In some examples, to operate on an unmanaged network, the device itself knows the security credentials, e.g., the security credentials are not provided by the server system along with the policies. This information is provided to the wireless network during connection operations.

Although the processes are described herein in the context of wireless networks, the processes may be used, where appropriate, to switch among frequency bands of wired networks or outside of a network context. For example, the processes may be used to switch among different frequencies on a digital subscriber line (DSL), although movement may not be a factor in this example.

Although the processes are described herein in the context of a wireless device moving through a stationary network, the processes are equally applicable for cases where the network access point is moving and the mobile device is either stationary or also moving. Relative motion between the network and the device causes the device to encounter different frequency bands, and may cause the processes described herein to implement frequency band switching.

Computing systems that may be used to implement all or part of the server system described herein may include various forms of digital computers. Examples of digital computers include, but are not limited to, laptops, desktops, workstations, personal digital assistants, servers, blade servers, mainframes, and other appropriate computers. Computing systems may be part of, included in, or used to implement all or part of the mobile devices described herein. Examples of mobile devices include, but are not limited to, tablet computing devices, personal digital assistants, cellular telephones, smartphones, digital cameras, digital glasses and other portable computing devices. The computing devices described herein, their connections and relationships, and their functions, are meant to be examples only, and are not meant to limit implementations of the technology.

All or part of the processes described herein and their various modifications (hereinafter referred to as "the processes") can be implemented, at least in part, via a computer program product, e.g., a computer program tangibly embodied in one or more information carriers, e.g., in one or more tangible machine-readable storage media, for execution by, or to control the operation of, data processing apparatus, e.g., a programmable processor, a computer, or multiple computers A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Non-transitory machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Each computing device, such as a smartphone or server, may include a hard drive for storing data and computer programs, and a processing device (e.g., a microprocessor) and memory (e.g., RAM) for executing computer programs.

A computing device may include a graphics system, including a display screen. A display screen, such as an LCD or a CRT (Cathode Ray Tube) displays, to a user, images that are generated by the graphics system of the computing device. As is well known, display on a computer display (e.g., a monitor) physically transforms the computer display. For example, if the computer display is LCD-based, the orientation of liquid crystals can be changed by the application of biasing voltages in a physical transformation that is visually apparent to the user. As another example, if the computer display is a CRT, the state of a fluorescent screen can be changed by the impact of electrons in a physical transformation that is also visually apparent. Each display screen may be touch-sensitive, allowing a user to enter information onto the display screen via a virtual keyboard. On some computing devices, such as a desktop or smartphone, a physical QWERTY keyboard and scroll wheel may be provided for entering information onto the display screen. A computing device, and computer programs executed thereon, may also be configured to accept voice commands, and to perform functions in response to such commands. For example, the example processes described herein may be initiated at a client, to the extent possible, via voice commands.

Elements of different implementations described herein may be combined to form other implementations not specifically set forth above. Elements may be left out of the processes, computer programs, interfaces, etc. described herein without adversely affecting their operation or the operation of the system in general. Furthermore, various separate elements may be combined into one or more individual elements to perform the functions described herein.

Other implementations not specifically described herein are also within the scope of the following claims.

What is claimed is:

1. A computerized method of operating a computerized client device, comprising:
    communicating with a server entity in data communication with an application on the computerized client device to obtain data relating to at least one policy, the at least one policy applicable to a class of devices to which the computerized client device belongs and comprising data relating to a level of service of a wireless network over a frequency band at which the computerized client device connects to the wireless network;
    detecting one or more wireless networks in range of the computerized client device, the one or more wireless networks supporting connection over at least two frequency bands;
    controlling the computerized client device to connect to a first one of the one or more wireless networks over a first one of the at least two frequency bands;
    configuring the application based on the at least one policy, the at least one policy comprising data relating to switching connectivity between the computerized client device and the one or more wireless networks over one or more of the at least two frequency bands; and
    controlling the computerized client device to switch over to a second one of the at least two frequency bands based on the at least one policy and one or more levels of service provided by the first one and the second one of the at least two frequency bands;

wherein:
    the communicating with the server entity comprises causing synchronization between the computerized client device and the server entity, the synchronization (i) performed according to a prescribed schedule, the prescribed schedule associated with a plurality of synchronization events to be performed at different pre-determined times, and (ii) comprising enabling the computerized client device to obtain the data relating to the at least one policy; and
    the controlling the computerized client device to switch over to the second one of the at least two frequency bands comprises delaying implementation of the switch over based on a completion of an existing data transfer over the first one of the at least two frequency bands.

2. The computerized method of claim 1, wherein the controlling the computerized client device to switch over to the second one of the at least two frequency bands comprises causing the computerized client device to switch based also on one or more attributes relating to one or more of: the computerized client device, the one or more wireless networks, or the at least two frequency bands.

3. The computerized method of claim 2, wherein the causing the computerized client device to switch based also on the one or more attributes comprises causing the computerized client device to switch based on at least one of network signal strength, device network preference, device location, or physical barriers within the first one of the one or more wireless networks.

4. The computerized method of claim 1, wherein the controlling the computerized client device to switch over to the second one of the at least two frequency bands comprises causing the computerized client device to maintain at least a target level of service over the first one of the one or more wireless networks after the switching, the target level of service after the switching being based on the at least one policy.

5. The computerized method of claim 1, wherein the controlling the computerized client device to switch over to the second one of the at least two frequency bands comprises causing the computerized client device to switch based at least on a location of the computerized client device relative to a network access point of the first one of the one or more wireless networks.

6. The computerized method of claim 1, wherein the controlling the computerized client device to switch over to the second one of the at least two frequency bands comprises causing the computerized client device to perform operations comprising:
    severing a connection to the first one of the one or more wireless networks over the first one of the at least two frequency bands; and
    connecting to a second one of the one or more wireless networks over the second one of the at least two frequency bands.

7. The computerized method of claim 1, further comprising severing the connection to the first one of the one or more wireless networks over the first one of the at least two frequency bands at entry into range of the second one of the at least two frequency bands of the first one of the one or more wireless networks; and
    wherein the controlling the computerized client device to switch over to the second one of the at least two frequency bands comprises controlling the computerized client device to connect to the first one of the one or more wireless networks over the second one of the at least two frequency bands within a threshold distance from an access point of the first one of the one or more wireless networks, the threshold distance being based on the range of the second one of the at least two frequency bands of the first one of the one or more wireless networks.

8. The computerized method of claim 1, further comprising:
ranking the one or more wireless networks and the at least two frequency bands based on levels of service; and
wherein the controlling the computerized client device to switch over to the second one of the at least two frequency bands is based at least on the ranking.

9. The computerized method of claim 1, wherein the controlling the computerized client device to switch over to the second one of the at least two frequency bands based on the levels of service comprises causing the computerized client device to switch to maintain at least a minimum throughput.

10. The computerized method of claim 1, further comprising determining a signal strength over each of the at least two frequency bands; and
wherein the controlling the computerized client device to switch over to the second one of the at least two frequency bands comprises causing the computerized client device to switch based at least on the signal strength over the each of the at least two frequency bands.

11. The computerized method of claim 1, further comprising determining a signal-to-noise ratio over each of the at least two frequency bands; and
wherein the controlling the computerized client device to switch over to the second one of the at least two frequency bands comprises causing the computerized client device to switch based at least on the signal-to-noise ratio over the each of the at least two frequency bands.

12. A computerized mobile device comprising:
processor apparatus;
network interface apparatus in data communication with a computerized server entity; and
storage apparatus in data communication with the processor apparatus, the storage apparatus comprising at least one computer program configured to, when executed on the processor apparatus:
receive data relating to one or more policies from the computerized server entity, the one or more policies comprising data relating to one or more conditions under which the computerized mobile device connects to a wireless network over a frequency band;
detect one or more wireless networks in range of the computerized mobile device, the one or more wireless networks supporting connection over at least two frequency bands;
generate data relating to a prediction of one or more levels of service associated with each of the at least two frequency bands, and generate a prioritization of the one or more wireless networks based at least on the generated data relating to the prediction;
control the computerized mobile device to connect to a first one of the one or more wireless networks over a first one of the at least two frequency bands;
configure a client application of the computerized mobile device based on at least one of the one or more policies that is unique to the computerized mobile device, the at least one of the one or more policies comprising data relating to control of connection between the computerized mobile device and the one or more wireless networks over one or more of the at least two frequency bands; and
control the computerized mobile device to switch over to a second one of the at least two frequency bands based on at least one of the one or more conditions or the prioritization.

13. The computerized mobile device of claim 12, wherein the at least one computer program is further configured to, when executed on the processor apparatus:
receive device security credentials, the device security credentials configured to be provided to the one or more wireless networks for connection to the one or more wireless networks over one or more of the at least two frequency bands.

14. The computerized mobile device of claim 12, wherein the at least one computer program is further configured to, when executed on the processor apparatus:
cause the computerized mobile device to switch over to the second one of the at least two frequency bands based at least on an evaluation that throughput over the second one of the at least two frequency bands will result in at least a percentage improvement over throughput over the first one of the at least two frequency bands, wherein the percentage improvement is based on the data relating to the one or more policies.

15. The computerized mobile device of claim 12, wherein the one or more policies are organized on the computerized server entity based at least on a unique identifying parameter of the computerized mobile device or a user associated therewith.

16. Computer readable apparatus comprising non-transitory storage media, the non-transitory storage media comprising at least one computer program having a plurality of instructions that are configured to, when executed by a processor apparatus:
cause synchronization between a computerized client device and a computerized server entity, the synchronization being (i) in accordance with a prescribed schedule, and (ii) configured to enable:
transmission of data representative of a request for data relating to one or more policies, the one or more policies comprising data relating to one or more conditions which can cause the computerized client device to connect to a wireless network over at least one radio frequency band; and
receipt of the data relating to the one or more policies from the computerized server entity;
monitor, in a substantially continuous fashion, for the one or more conditions, the monitoring comprising a background operation of the computerized client device;
detect one or more wireless networks within a range of the computerized client device, the one or more wireless networks supporting connection over at least two radio frequency bands;
cause the computerized client device to connect to a first one of the one or more wireless networks over a first one of the at least two radio frequency bands; and
cause the computerized client device to switch over to a second one of the at least two radio frequency bands based on the monitoring;
wherein the data relating to the one or more conditions comprises data specifying at least one of connection over, switching to, or steering between, respective ones of the at least two frequency bands based on at least a quality of service (QoS) achievable over the respective ones of the at least two frequency bands.

17. The computer readable apparatus of claim 16, wherein:
- the causation of the computerized client device to connect to the first one of the one or more wireless networks over the first one of the at least two frequency bands comprises an approval process, the approval process based at least on one or more votes cast by each of a plurality of computerized voting modules utilized by an application on the computerized client device; and
- at least one of the first one or the second one of the at least two frequency bands serve as a basis for the one or more votes.

18. The computer readable apparatus of claim 17, wherein the plurality of computerized voting modules are configured to evaluate a candidate network for connection based at least on the data relating to the one or more conditions.

19. The computer readable apparatus of claim 16, wherein the data relating to the one or more conditions comprises data specifying to control the computerized client device to connect over, to switch to, or to steer between, respective ones of the at least two frequency bands based on at least one connection frequency associated therewith.

20. The computer readable apparatus of claim 16, wherein the plurality of instructions are further configured to, when executed by the processor apparatus:
- rank the one or more wireless networks and the at least two frequency bands based on one or more levels of service associated with each; and
- wherein the causation of the computerized client device to switch over to the second one of the at least two frequency bands based on the monitoring is based at least on the rank.

\* \* \* \* \*